(12) United States Patent
Kim

(10) Patent No.: US 8,798,689 B2
(45) Date of Patent: Aug. 5, 2014

(54) APPARATUS AND METHOD FOR CONTROLLING FUNCTION OF COMMUNICATION MODULE IN PORTABLE TERMINAL

(75) Inventor: Jin-Man Kim, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/405,498

(22) Filed: Feb. 27, 2012

(65) Prior Publication Data

US 2013/0029732 A1    Jan. 31, 2013

(30) Foreign Application Priority Data

Jul. 27, 2011    (KR) .................. 10-2011-0074697

(51) Int. Cl.
*H04M 1/00*    (2006.01)

(52) U.S. Cl.
USPC .................. 455/574; 455/127.5; 455/343.4; 370/311

(58) Field of Classification Search
USPC .......... 455/574, 127.5, 343.2–343.5; 370/311
See application file for complete search history.

(56) References Cited

U.S. PATENT DOCUMENTS

2010/0255891 A1 *   10/2010   Conway et al. ............. 455/574

* cited by examiner

*Primary Examiner* — Junpeng Chen
(74) *Attorney, Agent, or Firm* — Cha + Reiter, LLC

(57) ABSTRACT

The present disclosure relates to an apparatus and a method for controlling a function of a communication module in a portable terminal, by which the function of the communication module can be automatically turned on or off in order to reduce the consumption of a battery of the portable terminal based on a connection/disconnection pattern, so that learning pattern the communication module selectively turned on a particular cycle calculated as a learning pattern.

17 Claims, 4 Drawing Sheets

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 0 | 0 | 0 | 0 | 0 | 0 | 1 | 1 | 1 | 1 | 1 | 1 | 1 | 1 |
| 2 | 1 | 1 | 1 | 1 | 1 | 1 | 1 | 0 | 0 | 0 | 0 | 0 | 0 | 0 | 0 | 0 | 0 | 0 | 0 | 0 | 1 | 1 | 1 | 1 |
| 3 | 0 | 1 | 1 | 1 | 1 | 1 | 0 | 0 | 0 | 0 | 0 | 0 | 0 | 0 | 0 | 0 | 1 | 1 | 1 | 1 | 1 | 1 | 1 | 1 |
| 4 | 0 | 1 | 1 | 1 | 1 | 1 | 0 | 0 | 0 | 0 | 0 | 0 | 0 | 1 | 1 | 0 | 0 | 0 | 0 | 1 | 1 | 1 | 1 | 1 |
| 5 | 0 | 0 | 1 | 1 | 1 | 1 | 0 | 1 | 1 | 0 | 0 | 1 | 0 | 1 | 0 | 1 | 1 | 1 | 1 | 1 | 0 | 0 | 0 | 0 |
| 6 | 1 | 1 | 1 | 1 | 1 | 1 | 1 | 1 | 1 | 1 | 1 | 1 | 1 | 1 | 0 | 0 | 1 | 1 | 1 | 1 | 1 | 1 | 1 | 1 |
| 7 | 1 | 1 | 1 | 1 | 1 | 1 | 0 | 0 | 0 | 1 | 1 | 0 | 0 | 1 | 1 | 1 | 1 | 1 | 0 | 0 | 0 | 0 | 1 | 1 |
| : | : | : | : | : | : | : | : | : | : | : | : | : | : | : | : | : | : | : | : | : | : | : | : | : |
| 20 | | | | | | | | | | | | | | | | | | | | | | | | |
| Importance | 12 | 17 | 20 | 20 | 20 | 19 | 16 | 11 | 9 | 9 | 6 | 6 | 4 | 4 | 2 | 2 | 7 | 8 | 10 | 10 | 11 | 13 | 14 | 15 |

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 0 | 0 | 0 | 0 | 0 | 0 | 1 | 1 | 1 | 1 | 1 | 1 | 1 | 1 |
| 2 | 1 | 1 | 1 | 1 | 1 | 1 | 1 | 0 | 0 | 0 | 0 | 0 | 0 | 0 | 0 | 0 | 0 | 0 | 0 | 0 | 1 | 1 | 1 | 1 |
| 3 | 0 | 1 | 1 | 1 | 1 | 1 | 0 | 0 | 0 | 0 | 0 | 0 | 0 | 0 | 0 | 0 | 1 | 1 | 1 | 1 | 1 | 1 | 1 | 1 |
| 4 | 0 | 0 | 1 | 1 | 1 | 1 | 0 | 0 | 0 | 0 | 0 | 0 | 0 | 1 | 1 | 0 | 0 | 0 | 0 | 1 | 1 | 1 | 1 | 1 |
| 5 | 0 | 1 | 1 | 1 | 1 | 1 | 0 | 1 | 1 | 0 | 0 | 1 | 0 | 1 | 0 | 1 | 1 | 1 | 1 | 1 | 0 | 0 | 0 | 0 |
| 6 | 1 | 1 | 1 | 1 | 1 | 1 | 1 | 1 | 1 | 1 | 1 | 1 | 1 | 1 | 0 | 0 | 1 | 1 | 0 | 1 | 1 | 1 | 1 | 1 |
| 7 | 1 | 1 | 1 | 1 | 1 | 1 | 0 | 0 | 0 | 1 | 1 | 0 | 0 | 1 | 1 | 1 | 1 | 1 | 0 | 0 | 0 | 0 | 1 | 1 |
| ... | .. | .. | .. | .. | .. | .. | .. | .. | .. | .. | .. | .. | .. | .. | .. | .. | .. | .. | .. | .. | .. | .. | .. | .. |
| 20 | | | | | | | | | | | | | | | | | | | | | | | | |
| Importance | 12 | 17 | 20 | 20 | 20 | 19 | 16 | 11 | 9 | 9 | 6 | 6 | 4 | 4 | 2 | 2 | 7 | 8 | 10 | 10 | 11 | 13 | 14 | 15 |

FIG.3

APPARATUS AND METHOD FOR CONTROLLING FUNCTION OF COMMUNICATION MODULE IN PORTABLE TERMINAL

CLAIM OF PRIORITY

This application claims priority under 35 U.S.C. §119(a) to a Korean Patent Application entitled "Apparatus and Method for Controlling Function of Communication Module in Portable Terminal" filed in the Korean Intellectual Property Office on Jul. 27, 2011 and assigned Serial No. 10-2011-0074697, the contents of which are incorporated herein by reference.

BACKGROUND OF THE INVENTION

1. Field of the Invention

The present invention relates to an apparatus and a method for controlling a communication module function in a portable terminal, and more particularly to an apparatus and a method for controlling so that the function of a communication module can be automatically turned on or off in order to reduce the battery consumption.

2. Description of the Related Art

When a Wireless Fidelity (Wi-Fi) function is available in a portable terminal, the Wi-Fi function is first turned on for connecting to a Wi-Fi service for data communication after a search for a Wi-Fi channel has been successful.

However, when the search for the Wi-Fi channel fails, i.e. the portable terminal is not located in a Wi-Fi service coverage area, in a state when the Wi-Fi function of the portable terminal is turned on, the portable terminal continuously and periodically searches for the Wi-Fi channel. Due to the periodic and continuous search, the amount of standby current of the portable terminal increases and discharged, thus shortening the battery life of the portable terminal.

SUMMARY OF THE INVENTION

Accordingly, the present invention has been made to solve the above-mentioned problems occurring in the prior art, and an aspect of the present invention provides an apparatus and a method for controlling a function of a communication module in a portable terminal, by which the function of the communication module can be automatically turned on or off in order to reduce the consumption of a battery of the portable terminal.

In accordance with an aspect of the present invention, an apparatus for controlling a function of a communication module in a portable terminal includes: a memory for storing times of using the communication module according to a learning pattern; and a controller for completing the function of the communication module after a predetermined amount of time period when the communication module is disconnected, and turning on the function of the communication module on a particular cycle calculated as a learning pattern.

In accordance with another aspect of the present invention, a method for controlling a function of a communication module in a portable terminal includes: completing the function of the communication module after a predetermined amount of time period when the communication module is disconnected; and turning on the function of the communication module on a particular cycle calculated as a learning pattern after the function of the communication module is completed.

BRIEF DESCRIPTION OF THE DRAWINGS

The above and other exemplary features, aspects, and advantages of the present invention will be more apparent from the following detailed description taken in conjunction with the accompanying drawings, in which:

FIG. 3 is learning pattern table according to an exemplary embodiment of the present invention.

DETAILED DESCRIPTION

Figure 1:
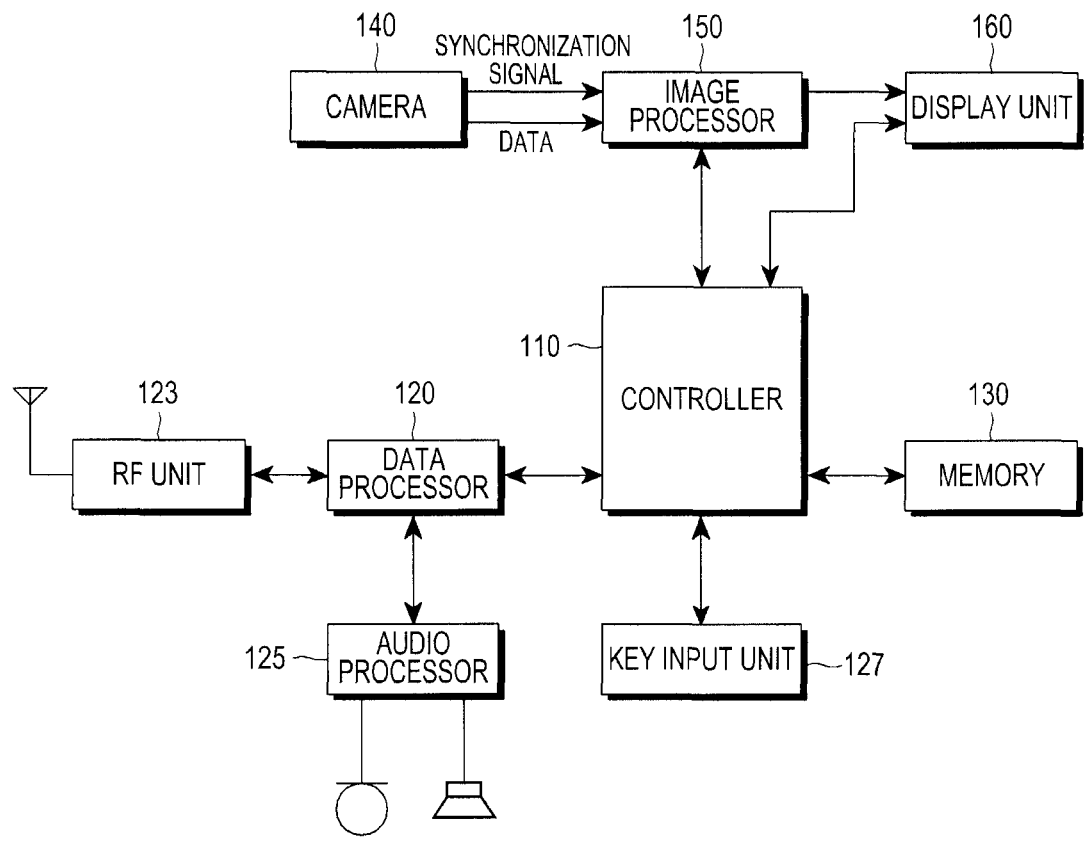
FIG. 1 is a block diagram illustrating the configuration of a portable terminal according to an exemplary embodiment of the present invention.

Hereinafter, exemplary embodiments of the present invention will be described in detail with reference to the accompanying drawings. It should be noted that, in the accompanying drawings, the same elements will be designated by the same reference numerals throughout the following description and drawings although they may be shown in different drawings.

Hereinafter, although a communication module for automatically controlling functions in a portable terminal, for example, is described as Wi-Fi in an exemplary embodiment of the present invention, the teaching of present invention is applicable to any other communication module having a similar scheme as Wi-Fi. In this case, any communication module can be connected to a relevant service through an on/off function and also perform data communication in a portable terminal.

FIG. 1 is a block diagram illustrating the configuration of a portable terminal according to an exemplary embodiment of the present invention.

Referring to FIG. 1, an RF unit 123 performs a wireless communication function of the portable terminal. The RF unit 123 includes an RF transmitter for upconverting the frequency of a signal to be transmitted and then amplifying the frequency-upconverted signal, an RF receiver for low-noise amplifying a received signal and then downconverting the frequency of the low-noise amplified signal, etc.

A data processor 120 includes a transmitter for encoding and modulating a signal to be transmitted, a receiver for demodulating and decoding a signal received by the RF unit 123, etc. Namely, the data processor 120 may include a modem (modulator/demodulator) and a codec (coder/decoder). In this case, the codec includes a data codec for processing packet data and the like, and an audio codec for processing audio signals including voice and the like.

The audio processor 125 reproduces a received audio signal, which has been output from the audio codec of the data processor 120, or transmits an audio signal to be transmitted, which is generated from a microphone, to the audio codec of the data processor 120.

A key input unit 127 may include keys for inputting numbers and text information and function keys for setting various functions.

A memory 130 may include a program memory and a data memory. The program memory may store programs for controlling a general operation of the portable terminal and programs capable of automatically turning on or off a Wi-Fi function according to an exemplary embodiment of the present invention. Also, the data memory temporarily stores data generated while the programs are performed.

According to an exemplary embodiment of the present invention, the memory 130 includes a register for storing a connection time of Wi-Fi and a disconnection time thereof.

Also, according to an exemplary embodiment of the present invention, the memory 130 stores times of using Wi-Fi according to a learning pattern, and stores the times of using the Wi-Fi according to the learning pattern in a learning pattern table.

Further, according to an exemplary embodiment of the present invention, the memory 130 stores the learning pattern table used to store relevant values obtained by discriminating times between the connection time of the Wi-Fi and the disconnection time thereof from remaining times and used to store an importance value calculated according to each time by using the relevant values.

In the learning pattern table, relevant values of "0s" which represent a period of using Wi-Fi, are stored for times between the connection time of the Wi-Fi and the disconnection time thereof, respectively. Relevant values of "1s" which represent a period of not using the Wi-Fi, are stored for remaining times, respectively.

Also, according to an exemplary embodiment of the present invention, the memory 130 stores a weight table, which is used to store a weight corresponding to an importance value according to each time, in the learning pattern table.

The controller 110 controls an overall operation of the portable terminal.

According to an exemplary embodiment of the present invention, the controller 110 completes a Wi-Fi function after a predetermined amount of time period when Wi-Fi is disconnected, and turns on the Wi-Fi function on a particular cycle calculated as a learning pattern.

According to an exemplary embodiment of the present invention, the controller 110 stores a connection time of the Wi-Fi and a disconnection time thereof in the register. Then, the controller 110 discriminates times between the connection time of the Wi-Fi and the disconnection time thereof from remaining times and then stores relevant values given by the discrimination, in the learning pattern table. Next, the controller 110 calculates an importance value according to each time by using the relevant values, and then stores the calculated importance value according to each time in the learning pattern table.

According to an exemplary embodiment of the present invention, when the Wi-Fi function has been turned on by a user and the Wi-Fi is connected, the controller 110 first initializes the register, and then stores the connection time of the Wi-Fi and the disconnection time thereof in the register.

According to an exemplary embodiment of the present invention, in the learning/disconnection pattern table, an index value is initially "0", and the controller 110 increases the index value by "1" and resets the index value to "0" if the index value becomes "20," when the controller 110 stores the connection time of the Wi-Fi and the disconnection time thereof in the register.

Also, according to an exemplary embodiment of the present invention, the controller 110 drives a first timer when the Wi-Fi is disconnected, completes the Wi-Fi function and drives a second timer when a time interval of the first timer is equal to or greater than a first predetermined time interval, and turns on the Wi-Fi function when a time interval of the second timer becomes a time interval obtained by multiplying a weight, which corresponds to a completion time of the Wi-Fi function, by a second predetermined time interval.

Also, according to an exemplary embodiment of the present invention, in order to extract a weight corresponding to the completion time of the Wi-Fi function, when the Wi-Fi function has been completed, the controller 110 extracts the completion time of the Wi-Fi function, extracts an importance value, which corresponds to the completion time of the Wi-Fi function, from the learning pattern table, and then extracts a weight, which corresponds to the extracted importance value, from a weight table.

Further, according to an exemplary embodiment of the present invention, when the controller 110 has turned on the Wi-Fi function, it searches for a Wi-Fi channel. When the search for the Wi-Fi channel is successful, the controller 110 connects the Wi-Fi to the Wi-Fi channel. On the contrary, when the search for the Wi-Fi channel fails, the controller 110 completes the Wi-Fi function.

A camera 140 includes a camera sensor for capturing image data and converting the captured light signal to an electrical signal, and a signal processor for converting the analog image signal, which has been captured by the camera sensor, to digital data. In this case, it is assumed that the camera sensor is a CCD (Charge-Coupled Device) sensor or a CMOS (Complementary Metal-Oxide Semiconductor) sensor, and the signal processor may be implemented by using a DSP (Digital Signal Processor). Also, the camera sensor and the signal processor may be implemented as one unit, or may be implemented as separate elements.

The image processor 150 performs ISP (Image Signal Processing) for displaying an image signal, which has been output from the camera 140, by a display unit 160. In this case, the term "ISP" refers to the execution of functions including a gamma correction, an interpolation, a spatial change, an image effect, an image scale, AWB (Auto White Balance), AE (Auto Exposure), AF (Auto Focus), etc. Therefore, the image processor 150 processes the image signal, which has been output from the camera 140, on a frame-by-frame basis, and outputs the frame image data in such a manner as to meet the characteristics and the size of the display unit 160. Also, the image processor 150 includes an image codec, and compresses the frame image data displayed by the display unit 160 in a set scheme, or restores the compressed frame image data to an original frame image data. In this case, the image codec may be implemented by using either a JPEG (Joint Photographic Coding Experts Group) codec, an MPEG-4 (Moving Picture Experts Group-4) codec, a Wavelet codec, or the like. It is assumed that the image processor 150 includes an OSD (On-Screen Display) function. The image processor 150 may output on-screen display data according to the size of a screen displayed under the control of the controller 110.

The display unit 160 displays an image signal, which has been output from the image processor 150, on a screen thereof, and displays user data which has been output from the controller 110. In this case, the display unit 160 may employ an LCD (Liquid Crystal Display), and thus may include an LCD controller, a memory capable of storing image data, an LCD display element, etc. When the LCD employs a touch screen, the display unit 160 may operate as an input unit. At this time, the display unit 160 may display keys which are identical to those of the key input unit 127.

A process for automatically controlling a Wi-Fi function in the portable terminal as described above will be described below in detail with reference to FIG. 2A and FIG. 2B.

Figure 2A:
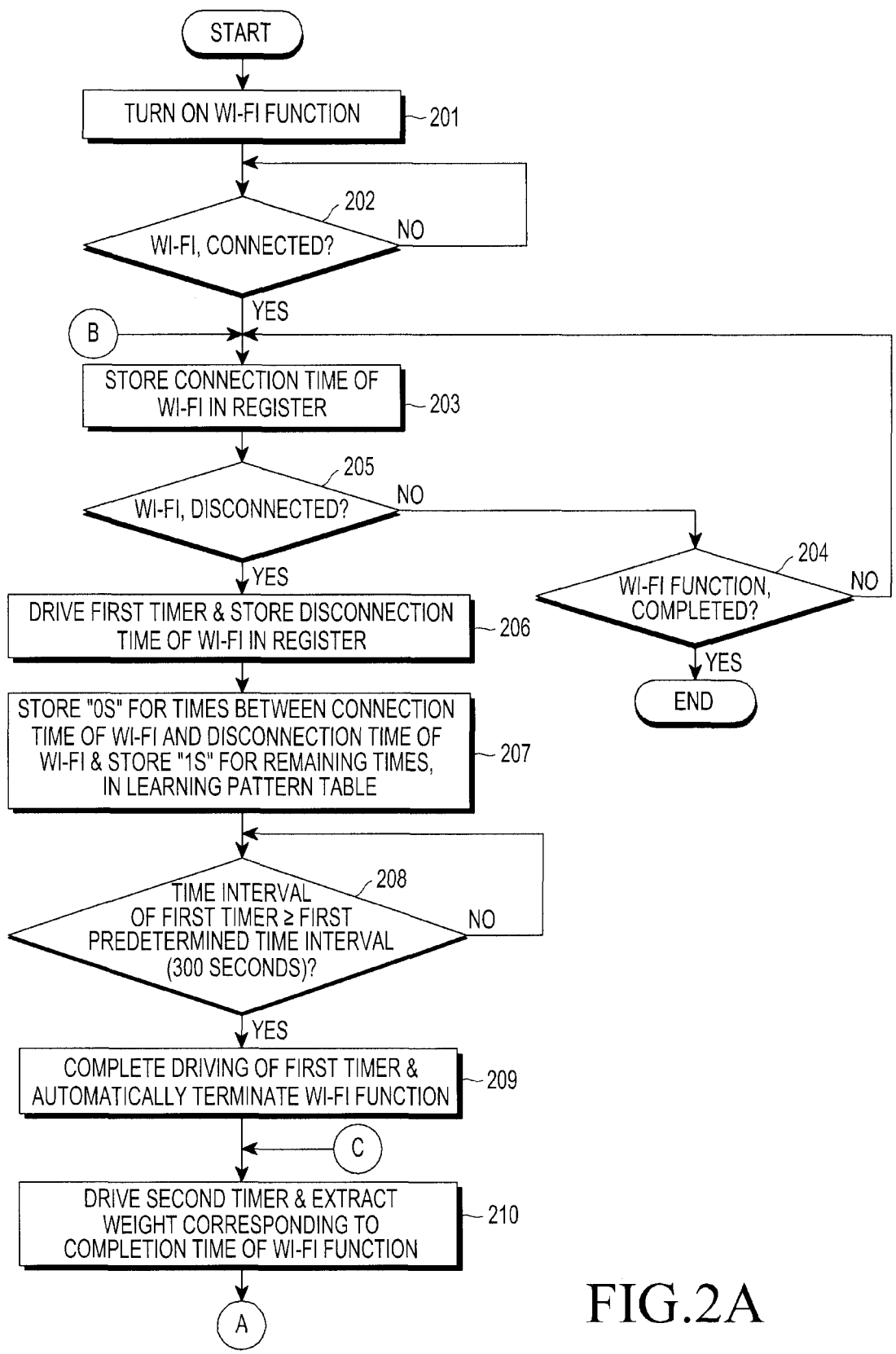
FIG. 2A and FIG. 2B are a flowchart showing a process for automatically controlling a function of a communication module in a portable terminal according to an exemplary embodiment of the present invention.
Figure 2B:
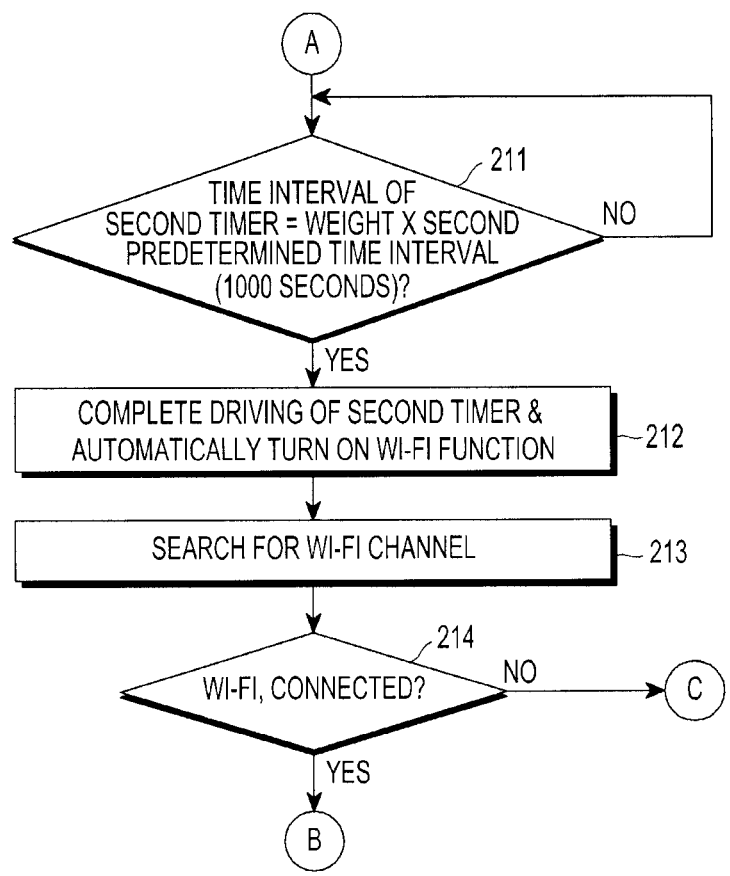

FIG. 2A and FIG. 2B, which are a flowchart showing a process for automatically controlling a function of a communication module in a portable terminal according to an exemplary embodiment of the present invention, are a flowchart showing a process for automatically controlling a Wi-Fi function in order to reduce the consumption of a battery.

Hereinafter, an exemplary embodiment of the present invention will be described below in detail with reference to FIG. 2A and FIG. 2B, together with FIG. 1.

Referring to FIG. 2A and FIG. 2B, after turning on a Wi-Fi function in the portable terminal in step 201, the controller 110 searches for a Wi-Fi channel in an area where the portable terminal is currently located.

When the search for the Wi-Fi channel has been successful and the Wi-Fi is connected to the Wi-Fi channel, the controller 110 detects the connection of the Wi-Fi in step 202, and then proceeds to step 203. In step 203, the controller 110 first initializes a register of the memory 130, and then extracts a connection time of the Wi-Fi and stores the extracted connection time in the register.

When the Wi-Fi function is completed by a user while the Wi-Fi service is used, the controller 110 detects the completion of the Wi-Fi function by the user in step 204, and completes the Wi-Fi function. Otherwise, the step 203 is repeated.

In step 205, when the Wi-Fi is disconnected while the Wi-Fi service is used, i.e. when the portable terminal leaves a Wi-Fi service coverage area and then a search for a Wi-Fi channel fails, the controller 110 detects the disconnection of the Wi-Fi, and then proceeds to step 206 where the controller 110 drives a first timer and stores the disconnection time of the Wi-Fi in the register.

When the connection time of the Wi-Fi and the disconnection time thereof have been stored in the register, the controller 110 increases an index value, which is initially "0," by "1" in a learning pattern table of the memory 130, the controller 110 proceeds to step 207.

In step 207, the controller 110 stores "0s," which represent a period of using Wi-Fi, for times between the connection time of the Wi-Fi and the disconnection time thereof among times ranging from 0 o'clock to 23 o'clock, and stores "1s," which represent a period of not using the Wi-Fi, for remaining times, respectively.

For example, when the connection time of the Wi-Fi is "9 o'clock" and the disconnection time thereof is "16 o'clock", the register stores values as shown in Table 1 below.

TABLE 1

| | Connection Information | |
| --- | --- | --- |
| | Connected | Disconnected |
| Time Information | 9 | 16 |

When the register has stored the connection time (i.e. 9 o'clock) of the Wi-Fi and the disconnection time (i.e. 16 o'clock) thereof as shown in Table 1, in a learning pattern table, as shown in FIG. 3 below, the controller 110 increases an index value, which is initially "0," by "1," stores "0s," which represent a period of using Wi-Fi, for times ranging from 10 o'clock to 15 o'clock between the connection time (i.e. 9 o'clock) of the Wi-Fi and the disconnection time (i.e. 16 o'clock) thereof, and then stores "1s," which represent a period of not using Wi-Fi, for remaining times which range from 0 o'clock to 9 o'clock and range from 16 o'clock to 23 o'clock, respectively. "Importance" in FIG. 3 represents the total count for each column.

Times of using Wi-Fi, which have been extracted in steps 201 to 207, are stored as a learning pattern in a learning pattern table as shown in FIG. 3, and then the controller 110 calculates an importance value according to each time and then stores the calculated importance value according to each time in the learning pattern table.

Next, when a time interval of the first timer, which has been driven in step 206, is equal to or greater than a first predetermined time interval, the controller 110 detects in step 208 that the time interval of the first timer is equal to or greater than the first predetermined time interval. Then, the controller 110 proceeds to step 209 where the controller 110 completes the first timer and automatically terminates the Wi-Fi function, meaning that the Wi-Fi function is turned off. In an exemplary embodiment of the present invention, the first predetermined time interval may be explained on the assumption that the first predetermined time interval is, for example, 300 seconds. Note that the first predetermined time interval can vary according to manufacturer or a user.

When the Wi-Fi function has been automatically completed in step 209, the controller 110 proceeds to step 210 where the controller 110 drives a second timer and extracts a weight corresponding to a completion time of the Wi-Fi function. Note that step 210 occurs because the user now has lost the Wi-Fi function.

In step 210, the controller 110 extracts the time of automatically terminating the Wi-Fi function, extracts an importance value, which corresponds to the time of automatically terminating the Wi-Fi function, from the learning pattern table, and then extracts a weight, which corresponds to the extracted importance value, from a weight table of the memory 130.

For example, when the first predetermined time interval is 300 seconds and the Wi-Fi function is automatically terminated together with the completion of driving of the first timer, the controller 110 extracts an importance value of "7" corresponding to "5 minutes past 16:00," which is the time of automatically terminating the Wi-Fi function, from the learning pattern table as shown in FIG. 3. Note 5 minutes are equal to 300 seconds. Then, the controller 110 extracts a weight of "2," which corresponds to the extracted importance value of "7," from a weight table as shown in Table 2 below.

Here, the time of automatically terminating the Wi-Fi function is "16:05", so the controller 110 extracts an importance value of "7" corresponding to "16:00" from FIG. 3, and then the controller 110 extracts a weight of "2," which corresponds to the extracted importance value of "7" because of "7" coming under "6-10", from a weight table as shown in Table 2.

TABLE 2

| Importance | Weight |
| --- | --- |
| 16 to 20 | 7 |
| 11 to 15 | 4 |
| 6 to 10 | 2 |
| 0 to 5 | 1 |

Next, when a time interval of the second timer becomes a value obtained by multiplying the extracted weight by a second predetermined time interval, the controller 110 detects in step 211 that the time interval of the second timer becomes the value obtained by multiplying the extracted weight by the second predetermined time interval, and then proceeds to step 212 where the controller 110 completes driving of the second timer and automatically turns on the Wi-Fi function. In an exemplary embodiment of the present invention, the second predetermined time interval may be 1000 seconds, for illustrative purposes.

As described above, the more frequently Wi-Fi connections are made in a time zone, the smaller a weight becomes therein. Therefore, a time interval between automatic ON times of the Wi-Fi function becomes shorter in a time zone, for which the Wi-Fi connections are frequently made, than in a time zone for which the Wi-Fi connections are not frequently made.

In step 212, when the controller 110 automatically turns on the Wi-Fi function, the controller 110 proceeds to step 213 where a full search is made for a Wi-Fi channel.

When a result of the search in step 213 shows that the search for the Wi-Fi channel is successful, the controller 110 detects that the search for the Wi-Fi channel is successful, and connects the Wi-Fi to the Wi-Fi channel, in step 214. Then, it proceeds to step 203.

However, when the result of the search in step 213 shows that the search for the Wi-Fi channel fails, the controller 110 detects that the search for the Wi-Fi channel fails, and automatically turns off the Wi-Fi, in step 214. Then, it proceeds to step 210.

Having thus described a preferred embodiment of an apparatus and a method for controlling a function of a communication module in a portable terminal, it should be apparent to those skilled in the art that certain advantages have been achieved. The foregoing is to be constructed as only being an illustrative embodiment of this invention. When the communication module is not located in a service coverage area in a state where the function of the communication module is turned on, the function of the communication module is automatically turned on or off, so that the consumption of a battery of the portable terminal can be reduced.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the specific exemplary embodiments such as a portable terminal have been shown and described in the description of the present invention as described above, various changes in form and details may be made in the specific exemplary embodiments of the present invention without departing from the spirit and scope of the present invention. Therefore, the spirit and scope of the present invention should be defined not by the described embodiments thereof but by the appended claims and equivalents of the appended claims.

What is claimed is:

1. An apparatus for controlling a function of a communication module in a portable terminal, comprising:
    a memory for storing times indicative of whether the communication module is operative to generate a learning pattern; and
    a controller for collecting and storing the learning pattern when the communication module is disconnected and for calculating a time for turning on the function of the communication module using the stored learning pattern;
    wherein the memory stores the learning pattern which includes relevant values obtained by discriminating times between a connection time of the communication module and a disconnection time of the communication module, the learning pattern further includes an importance value calculated according to using the relevant values to determine a particular cycle.

2. The apparatus as claimed in claim 1, wherein the relevant values of the times between the connection time of the communication module and the disconnection time of the communication module are equal to "0s" which represent a period of using the communication module, respectively, and the relevant values of the remaining times are equal to "1s" which represent a period of not using the communication module, respectively.

3. The apparatus as claimed in claim 1, wherein the memory includes a register for storing a connection time of the communication module and a disconnection time of the communication module.

4. The apparatus as claimed in claim 1, wherein the memory stores a weight table, which is used to store a weight corresponding to an importance value according to each time in a learning pattern table.

5. The apparatus as claimed in claim 1, wherein the controller stores a connection time of the communication module and a disconnection time of the communication module in a register, discriminates times between the connection time of the communication module and the disconnection time of the communication module from and stores relevant values given by the discrimination in a learning pattern table, and calculates an importance value according to each time using the relevant values and stores the calculated importance value according to each time in the learning pattern table.

6. The apparatus as claimed in claim 1, wherein the controller drives a first timer when the communication module is disconnected, terminates the function of the communication module and drives a second timer when a time interval of the first timer is equal to or greater than a first predetermined time interval, and turns on the function of the communication module when a time interval of the second timer becomes a time interval obtained by multiplying a weight, which corresponds to a completion time of the function of the communication module, by a second predetermined time interval.

7. The apparatus as claimed in claim 6, wherein, when the function of the communication module has been completed, the controller extracts the completion time of the function of the communication module, extracts an importance value, which corresponds to the completion time of the function of the communication module, from a learning pattern table, and extracts a weight, which corresponds to the extracted importance value, from a weight table.

8. The apparatus as claimed in claim 6, wherein the controller searches for a channel of the communication module when the function of the communication module has been turned on, connects the communication module to the channel of the communication module when the search for the channel of the communication module is successful, and terminates the function of the communication module when the search for the channel of the communication module fails.

9. A method for controlling a function of a communication module in a portable terminal, the method comprising:
    collecting and storing a learning pattern when the communication module is disconnected; and
    calculating a time for turning on the function of the communication module using the stored learning pattern;
    wherein collecting and storing the learning pattern comprises:

discriminating the times between a connection time of a communication module and a disconnection time of the communication module, and including the relevant values given by the discrimination to the learning pattern; and calculating an importance value according to each time using the relevant values, and including the calculated importance value according to each time to the learning pattern.

10. The method as claimed in claim 9, wherein collecting and storing the learning pattern comprises:

driving a first timer when the communication module disconnects; and terminating the function of the communication module when a time interval of the first timer is equal to or greater than a first predetermined time interval.

11. The method as claimed in claim 9, wherein the relevant values of the times between the connection time of the communication module and the disconnection time of the communication module are equal to "0s" which represent a period of using the communication module, respectively, and the relevant values of the remaining times are equal to "1s" which represent a period of not using the communication module, respectively.

12. The method as claimed in claim 9, wherein calculating a time for turning on the function of the communication module comprises:

driving a second timer when the function of the communication module is terminated; and turning on the function of the communication module when a time interval of the second timer becomes a time interval obtained by multiplying a weight, which corresponds to a completion time of the function of the communication module, by a second predetermined time interval.

13. The method as claimed in claim 12, wherein turning on the function of the communication module comprises:

when the function of the communication module has been completed, extracting the completion time of the function of the communication module;

extracting an importance value, which corresponds to the completion time of the function of the communication module, from a learning pattern table; and extracting a weight, which corresponds to the extracted importance value, from a weight table.

14. The method as claimed in claim 9, further comprising:

searching for a channel of the communication module when the communication module has been turned on;

connecting the communication module to the channel of the communication module when the search for the channel of the communication module is successful; and terminating the function of the communication module when the search for the channel of the communication module fails.

15. A terminal for saving a battery life by selectively turning on a communication module of the terminal, comprising:

a memory for storing times indicative of whether the communication module is operative to generate a disconnection pattern; and a controller for collecting and storing a learning pattern when the communication module is disconnected and for calculating a time for turning on a function of the communication module using the stored learning pattern;

wherein the memory stores the learning pattern table which includes relevant values obtained by discriminating times between a connection time of the communication module and a disconnection time of the communication module, the learning pattern further includes an importance value calculated using the relevant values to determine a particular cycle.

16. The terminal as claimed in claim 15, wherein the memory includes a register for storing a connection time of the communication module and a disconnection time of the communication module.

17. The terminal as claimed in claim 15, wherein the controller drives a first timer when the communication module is disconnected, terminates the function of the communication module and drives a second timer when a time interval of the first timer is equal to or greater than a first predetermined time interval, and turns on the function of the communication module when a time interval of the second timer becomes a time interval obtained by multiplying a weight, which corresponds to a completion time of the function of the communication module, by a second predetermined time interval.

* * * * *